US010503210B2

(12) United States Patent
Lee et al.

(10) Patent No.: US 10,503,210 B2
(45) Date of Patent: Dec. 10, 2019

(54) FOLDING DEVICE OF FOLDABLE DISPLAY AND DISPLAY DEVICE HAVING THE SAME

(71) Applicant: LG Display Co., Ltd., Seoul (KR)

(72) Inventors: Dai-Yun Lee, Gimpo-si (KR); Jun-Hyung Kim, Seoul (KR); Seung-O Jeon, Seoul (KR); Young-Joon Yun, Paju-si (KR); Shin-Suk Lee, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/827,871

(22) Filed: Nov. 30, 2017

(65) Prior Publication Data

US 2018/0150107 A1    May 31, 2018

(30) Foreign Application Priority Data

Nov. 30, 2016 (KR) .......... 10-2016-0162345

(51) Int. Cl.
*G06F 1/16* (2006.01)
*H04M 1/02* (2006.01)

(52) U.S. Cl.
CPC .......... *G06F 1/1641* (2013.01); *G06F 1/1616* (2013.01); *G06F 1/1681* (2013.01); *H04M 1/0216* (2013.01); *H04M 1/0218* (2013.01); *E05Y 2900/606* (2013.01); *G06F 1/1652* (2013.01); *H04M 1/0247* (2013.01); *H04M 1/0268* (2013.01)

(58) Field of Classification Search
CPC ............. E05Y 2900/606; G06F 1/1616; G06F 1/1641; G06F 1/1652; G06F 1/1681; H04M 1/0216; H04M 1/0218; H04M 1/0247; H04M 1/0268

See application file for complete search history.

(56) References Cited

U.S. PATENT DOCUMENTS

| | | | | |
|---|---|---|---|---|
| 9,915,086 | B2* | 3/2018 | Kato | E05D 11/087 |
| 10,037,058 | B2* | 7/2018 | Kato | F16C 11/045 |
| 2007/0117600 | A1 | 5/2007 | Robertson et al. | |
| 2010/0232100 | A1* | 9/2010 | Fukuma | F16G 13/18 |
| | | | | 361/679.01 |
| 2014/0174226 | A1* | 6/2014 | Hsu | E05D 3/122 |
| | | | | 74/98 |
| 2018/0067519 | A1* | 3/2018 | Tazbaz | E05D 3/06 |

FOREIGN PATENT DOCUMENTS

| | | |
|---|---|---|
| CN | 205371288 U | 7/2016 |
| CN | 205533749 U | 8/2016 |
| KR | 10-2015-0135666 A | 12/2015 |

OTHER PUBLICATIONS

China National Intellectual Property Administration, Notification of the First Office Action, CN Patent Application No. 201711237888.0, dated Sep. 6, 2019, 17 pages.

* cited by examiner

*Primary Examiner* — James Wu
(74) *Attorney, Agent, or Firm* — Fenwick & West LLP

(57) ABSTRACT

Disclosed are a folding device of a foldable display and a display device having the same. The folding device is rotatable sequentially or in stages through a plurality of unit hinges rotated relative to one another about multiple axes. Therefore, the folding device is applicable to both an inner folding type and an outer folding type, and the respective unit hinges are rotated by gear motions and may thus be stably rotated and assure reliability.

12 Claims, 7 Drawing Sheets

FOLDING DEVICE OF FOLDABLE DISPLAY AND DISPLAY DEVICE HAVING THE SAME

CROSS-REFERENCE TO RELATED APPLICATION

This application claims the benefit of Republic of Korea Patent Application No. 10-2016-0162345, filed on Nov. 30, 2016, which is hereby incorporated by reference as if fully set forth herein.

BACKGROUND OF THE INVENTION

Field of the Invention

The present invention relates to a folding device of a foldable display with a display panel that may folded or unfolded.

Discussion of the Related Art

Recently, mobile terminals, such as wireless terminals, personal digital assistants (PDAs), portable multimedia players (PMPs), tablets, etc., tend to be miniaturized for portability. However, since users want to receive information from various content, such as characters, moving pictures, still pictures, MP3, games, etc., through screens of mobile terminals, large-sized or wide display screens have been required. Miniaturization of mobile terminals causes size reduction of display screens and, thus, there is a trade-off between these two requirements.

To address such issues, a flexible display device, such as a bendable display device or a foldable display device, has been developed. Such a flexible display device may be implemented as an organic electroluminescent device in which a substrate is formed of plastic, and the organic electroluminescent device, which is a self-luminous device, does not require a backlight used in a liquid crystal display, which is a non-luminous device, and may thus be lightweight and thin.

Further, since the flexible display device may be conveniently portable when it is folded and achieve a large screen when it is unfolded, the flexible display device may be applied to various fields, i.e., not only mobile equipment, such as mobile phones, ultra-mobile PCs, e-books, electronic newspapers, etc., but also TVs, monitors, etc.

When a foldable display device is used as the flexible display device, hinge mechanisms are fastened to a folding area of a display panel. Hinge mechanisms generally use link combinations having various structures or are rotated through gear engagement, thus achieving a folding function.

However, there is a limit to individually folding such hinge mechanisms while maintaining a set angle through interconnected link structures. Further, during a process of restoring hinge mechanisms in the folded state to its original states, it is difficult to individually rotate the hinge mechanisms without unified orientation so as to assure stable operation.

In addition, these hinge mechanisms may not be applied to both an inner folding type display panel which is folded inwards through hinge mechanisms, and an outer folding type display panel which is folded outwards through hinge mechanisms and, thus, there is a structural problem in which hinge mechanisms corresponding to the respective folding types are individually manufactured.

SUMMARY OF THE INVENTION

Embodiments relate to a folding device of a foldable display that includes a plurality of unit hinges, a plurality of connection unit. Each of the unit hinges rotatable relative to an adjacent unit hinge. Each of the unit hinges comprise a first rotary shaft, a second rotary shaft, a first gear and a second gear. The first rotary shaft extends in a direction around which each of the unit hinges rotates relative to the adjacent unit hinge. The second rotary shaft extends in parallel relative to the first rotary shaft and is spaced apart from the first rotary shaft. The first gear is placed closer to the first rotary shaft than the second rotary shaft. The second gear meshes with a first gear of an adjacent unit hinge. The second gear is placed closer to the second rotary shaft than the first rotary shaft. The connection units are between two adjacent unit hinges of the plurality of unit hinges. Each of the connection units secure the second rotary shaft of each of the unit hinges and a first rotary shaft of the adjacent unit hinge in a rotatable manner.

In one embodiment, the first gear is formed on a first end of each of the unit hinges and the second gear is formed on a second end of each of the unit hinges.

In one embodiment, the first end and the second end are semi-cylindrical shaped.

In one embodiment, at least one of the unit hinges further includes a rotation restriction member protruding from the first end in a direction away from the second end, and an interference groove. The interference groove is formed in the second end to receive a rotating restriction member of a unit hinge adjacent to the at least one of the unit hinges and restricts a relative rotation between the at least one of the unit hinges and an unit hinge adjacent to the at least one of the unit hinges to a predetermined range.

In one embodiment, a relative rotation of a first pair of the unit hinges is independent of a relative rotation of a second pair of the unit hinges.

In one embodiment, the unit hinges includes a first unit hinge, a second unit hinge adjacent to and meshing with the first unit hinge, and a third unit hinge adjacent to and meshing with the second unit hinge.

In one embodiment, a relative rotation between the first unit hinge and the second unit hinge occurs before or after a relative rotation between the second unit hinge and the third unit hinge.

In one embodiment, the folding device is attached to a display panel that is folded in an outer folding manner so that a display area of the display panel faces outwards when folded.

In one embodiment, the folding device is attached to a display panel that is folded in an inner folding manner so that portions of a display area of the display panel face each other when folded.

In one embodiment, each of the first end and the second end has a semi-cylindrical surface on which the first gear or the second gear is formed.

In one embodiment, the unit hinges further include rotation restriction plates on at least upper parts or lower parts of the unit hinges. The rotation restriction plates partially overlap responsive to relative rotating of the unit hinges over a predetermined range to restrict the relative rotation of the unit hinges.

In one embodiment, the first gear is attached to the first rotary shaft and shares a same axis as the first rotary shaft, and the second gear is attached to the second rotary shaft and shares a same axis as the second rotary shaft.

In one embodiment, the rotation restriction plates are part of a body onto which the first gear and the second gear are attached.

In one embodiment, upper surfaces of the rotation restriction plates at an upper side of the unit hinges align with a shared plane when the folding device is unfolded.

In one embodiment, the unit hinges include a first set of the rotation restriction plates at an upper side of the unit hinges, and a second set of rotation restriction plates at a lower side of the unit hinges to restrict rotations of the unit hinges in a first direction and in a second direction opposite to the first direction.

In one embodiment, a display panel is attached to and supported by the plurality of unit hinges.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
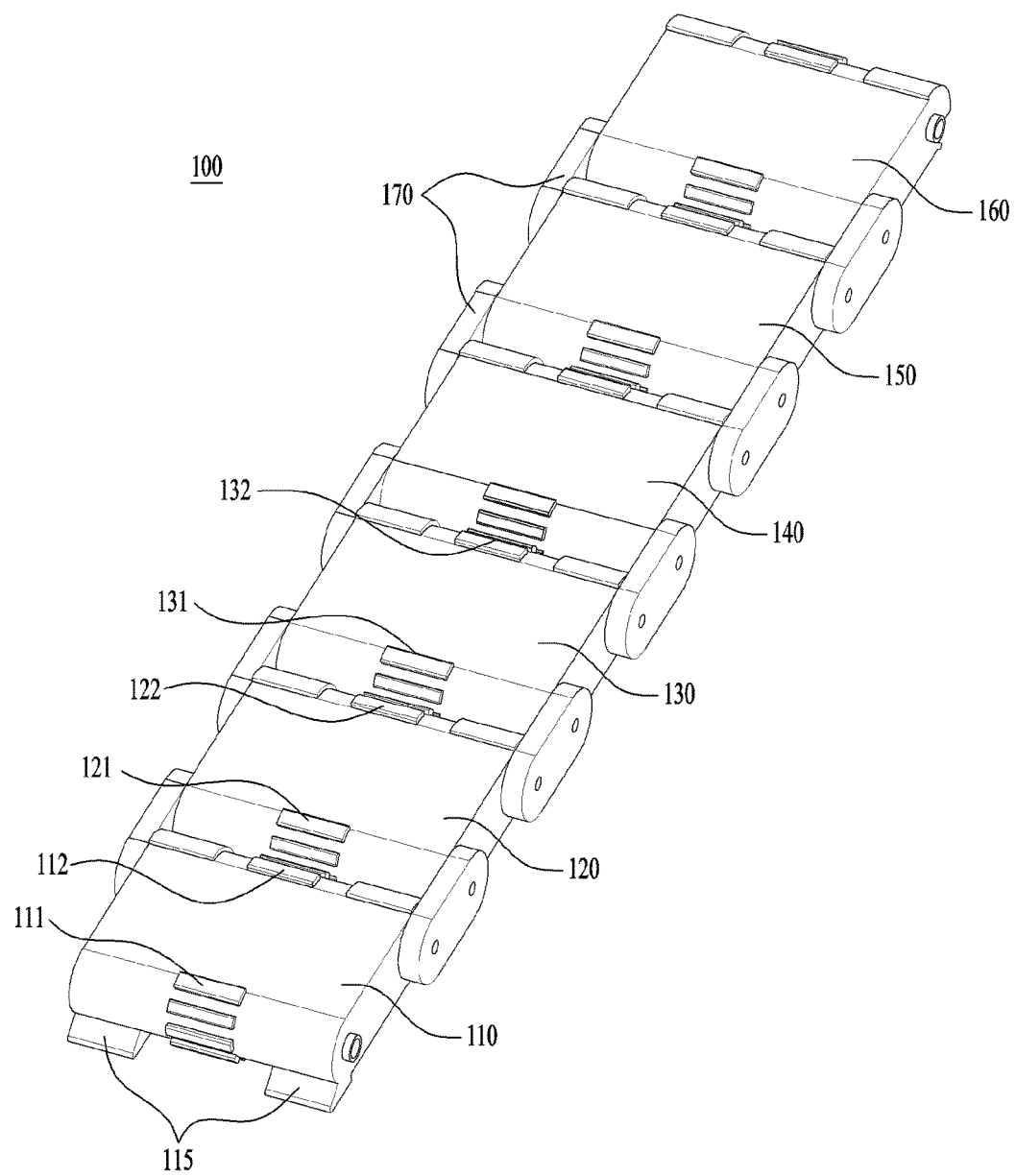
FIG. 1 is a perspective view of a folding device of a foldable display in accordance with one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear. Those skilled in the art will appreciate that any features illustrated in the drawings may be magnified, reduced or simplified for ease of description, and the drawings and elements thereof are not always illustrated to scale.

Embodiments relate to a folding device of a foldable display which achieves relative rotation sequentially or in stages during folding or unfolding the foldable display so as to assure stable operation and is applicable to both an inner folding manner and an outer folding manner.

Figure 2:
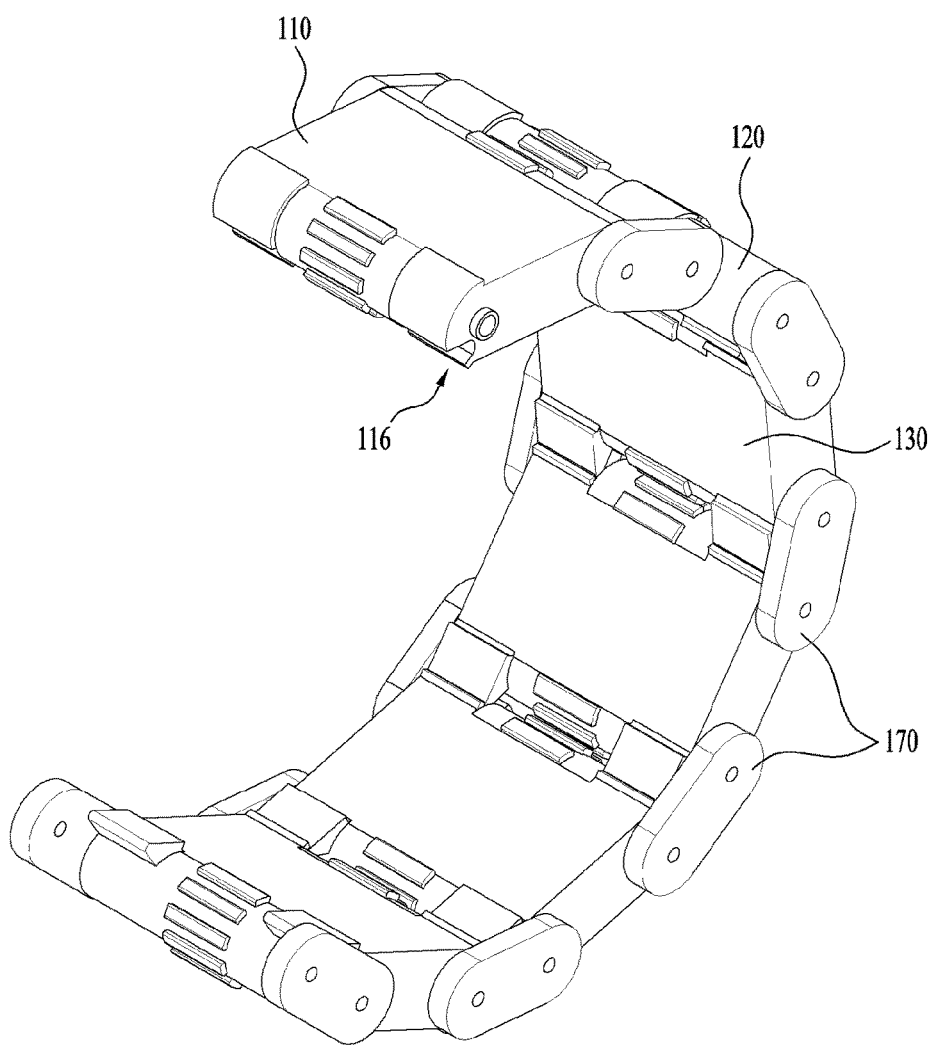
FIG. 2 is a perspective view illustrating the folding device shown in FIG. 1 in a folded state, in accordance with one embodiment of the present invention.
Figure 3:
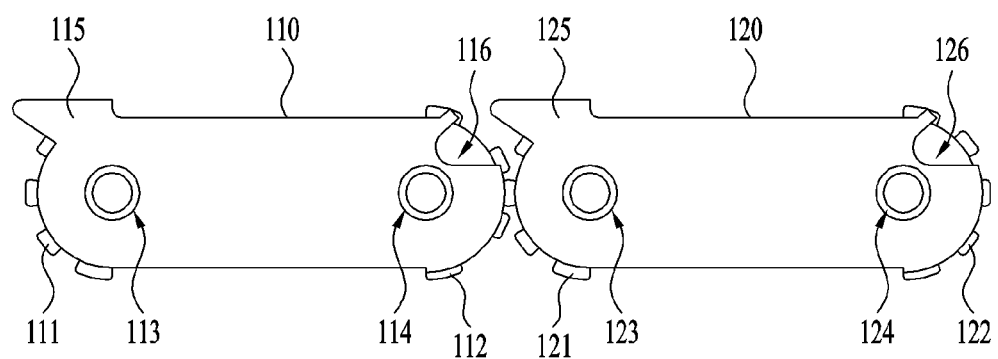
FIGS. 3 and 4 are partial cross-sectional views of the folding device shown in FIG. 1, in accordance with one embodiment of the present invention.
Figure 4:
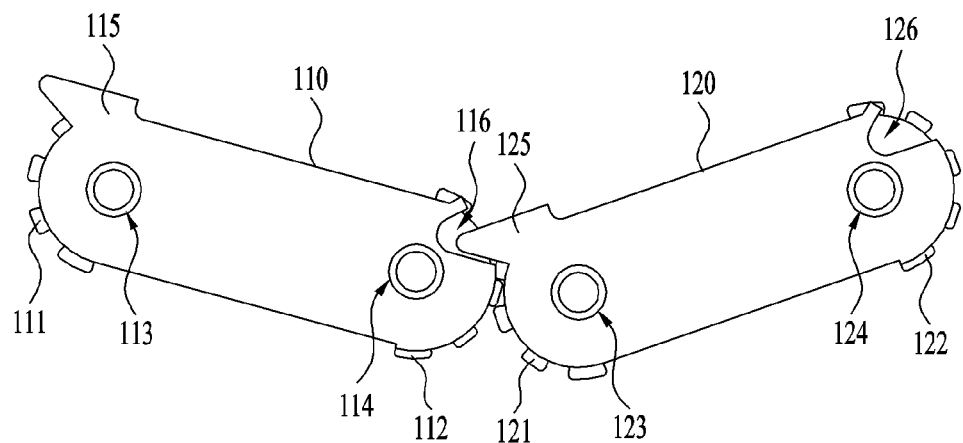

FIG. 1 is a perspective view of a folding device 100 of a foldable display in accordance with one embodiment of the present invention, FIG. 2 is a perspective view illustrating the folding device 100 shown in FIG. 1 in a folded state, and FIGS. 3 and 4 are partial cross-sectional views of the folding device 100 shown in FIG. 1.

The folding device 100 of a foldable display in accordance with one embodiment of the present invention includes a first unit hinge 110, a second unit hinge 120 having the same structure and provided with one side engaged with one side of the first unit hinge 110 so as to be rotated relative to the first unit hinge 110, a third unit hinge 130 provided with one side engaged with the other side of the second unit hinge 120 so as to be rotated relative to the second unit hinge 120, and connection units 170. Each of the connection units 170 interconnects the first unit hinge 110 to the third unit hinge 130.

The folding device 100 is attached to a display panel 10 (with reference to FIG. 8) of a foldable display and provides a function of maintaining a rotated state of the foldable display by a designated angle or a folded state of the foldable display.

The display panel 10 includes a non-display area at the edge of the upper surface thereof and a display area located within the non-display area and displaying an image. The display panel 10 has flexibility, i.e., is flexibly bendable.

The display panel 10 may include organic light emitting diodes (OLEDs). Further, the display panel 10 has a rectangular shape and, particularly, has a wide screen shape in which a horizontal length thereof is greater than a vertical length thereof. However, the display panel 10 is not limited to the above shape, and may have a circular or polygonal shape and be formed in an oval, triangular or lozenge shape through a folding process.

The folding device 100 of the foldable display, which is an assembly of a plurality of unit hinges, is provided in a folding area of the display panel 10. For example, the folding device 100 may be disposed at both sides of the folding area of the display panel 10 except for the center of the folding area, or be disposed throughout the folding area of the display panel 10. Otherwise, the folding device 100 may be disposed in three or more regions of the folding area. The disposition of the folding device 100 may be changed according to the position of a substrate, a battery, or various units or modules combined around the folding device 100 of the foldable display.

The first unit hinge 110 has a long oval cross-section, as seen from the side, a first rotary shaft 113 and a second rotary shaft 114 are disposed at both sides of the first unit hinge 110, a first gear 111 is provided on the outer surface of one side of the first unit hinge 110 closer to the first rotary shaft 113 than the second rotary shaft 114, and a second gear 112 is provided on the outer surface of the other side of the first unit hinge 110 closer to the second rotary shaft 114 that the first rotary shaft 113.

The first gear 111 or the second gear 112 is disposed on the entirety or a part of each of the corresponding sections of the outer surface of the first unit hinge 110, and is engaged with a second gear or a first gear provided on another adjacent unit hinge.

Figure 8:
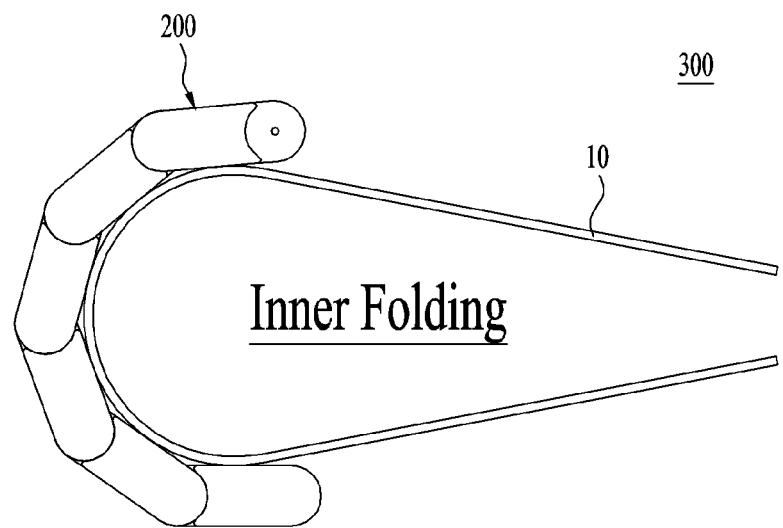
FIGS. 8 and 9 are views illustrating types of foldable display devices having the folding device shown in FIG. 5, according to embodiments of the present invention.

The first unit hinge 110, the second unit hinge 120, and the third unit hinge 130 have the same structure, and the size or the number of the unit hinges may be changed according to the folding angle of the display panel 10 (with reference to FIG. 8). Although this embodiment describes the first unit hinge 110, the second unit hinge 120, and the third unit hinge 130 out of a plurality of unit hinges, the remaining unit hinges have the same function and configuration as those of the first unit hinge 110, the second unit hinge 120, and the third unit hinge 130, and a detailed description thereof will be omitted herein for the sake of brevity.

However, out of the unit hinges, the unit hinge located at one end may be fixed to one side of the display panel or a case combined therewith, and the unit hinge located at the other end may be combined with the other side of the display panel or the case combined therewith so as to be flexibly transferred. The reason for this is that, during folding of the folding device 100, the folding device 100 may cope with relative length change of another element located in the inner region or the outer region, i.e., the display panel, the substrate or the case.

FIG. 1 illustrates the folding device 100 in an unfolded state as including six unit hinges, and FIG. 2 illustrates the folding device 100 in a folded state. First, it is assumed that the first rotary shaft 113 of the first unit hinge 110 is fixed to an inner element of the foldable display. The second unit hinge 120 is connected to the first unit hinge 110 so as to be rotatable about the second rotary shaft 114 of the first unit hinge 110, and the third unit hinge 130 is connected to the second unit hinge 120 so as to be rotatable about the second rotary shaft 124 of the second unit hinge 120. Hereinafter, the remaining unit hinges, i.e., the fourth unit hinge 140, the fifth unit hinge 150 and the sixth unit hinge 160, have the same combination relations as the first unit hinge 110, the second unit hinge 120, and the third unit hinge 130, and are rotated sequentially in the same manner as the first unit hinge 110, the second unit hinge 120, and the third unit hinge 130.

The first unit hinge 110 and the second unit hinge 120 are combined by connecting the second rotary shaft 114 of the first unit hinge 110 and the first rotary shaft 123 of the second unit hinge 120 by the connection unit 170. Further, the second unit hinge 120 and the third unit hinge 130 are combined by connecting the second rotary shaft 124 of the second unit hinge 120 and the first rotary shaft 133 of the third unit hinge 130 by the connection unit 170. The first unit hinge 110, the second unit hinge 120, and the third unit hinge 130 are combined so as to be rotatable relative to one another for sequential rotation.

Since the first rotary shaft 113 of the first unit hinge 110 is fixed, the remaining unit hinges including the second unit hinge 120 may be relatively rotated about the second rotary shaft 114 of the first unit hinge 110.

Further, when rotation of the second unit hinge 120 relative to the first unit hinge 110 has been completed, the remaining unit hinges including the third unit hinge 130 are relatively rotated by the same angle about the second rotary shaft 124 of the second unit hinge 120.

When the second unit hinge 120 to the sixth unit hinge 160 have been sequentially rotated, for example, the unit hinges form a shape that approximates a C shape, as shown in FIG. 2. In the example of FIG. 2, the second gear 112 of the first unit hinge 110 is engaged with the first gear 121 of the second unit hinge 120, and only the second unit hinge 120 is relatively rotated. Of course, rotation of the second unit hinge 120 relative to the first unit hinge 110 does not interfere with rotation of other unit hinges. That, the respective unit hinges 110, 120, 130, 140, 150 and 160 may be independently rotated. The reason why independent rotation is enabled is that the unit hinges 110, 120, 130, 140, 150 and 160 are respectively rotated about two or more axes, i.e., multiple axes, and are configured such that the unit hinges 110, 120, 130, 140, 150 and 160 are relatively rotated sequentially or in stages. That is, if a gear is rotated about a single axis, other gears are rotated in connection with the rotating gear and all the gears are simultaneously rotated and, thus, sequential rotation or step-by-step rotation may not be executed.

A rotation restriction member 115 protrudes from one side of the lower surface of the first unit hinge 110, and an interference groove 116 is provided at the other side of the lower surface of the first unit hinge 110. A rotation restriction member 125 of the second unit hinge 110 is inserted into the interference groove 116. Therefore, as shown in FIG. 2, if the folding device 100 is folded, the rotation restriction members (e.g., 115, 125) provided on the respective unit hinges are inserted into the interference grooves (e.g., 116, 126) provided on the adjacent unit hinges 110 to 160 and causes interference. As the rotation restriction members (e.g., 115, 125) contact the corresponding interference grooves (e.g., 116, 126), the angular range of relative rotation between the adjacent unit hinges is restricted. For example, the rotation angle between the adjacent unit hinges may be adjusted by setting a degree of protrusion of the rotation restriction members or a depth of the interference grooves. Further, when the rotation restriction members contact the corresponding interference grooves, a desired radius of curvature of the folding area of the folded display panel may be provided while retaining the rigidity of the folding area.

Further, as the folding device 100 may be applied to both an outer folding type in which a display panel is folded so as to be exposed to the outside and an inner folding type in which a display panel is folded inwards so that both sections thereof overlap each other, it is not necessary to separately provide folding devices for foldable displays of respective types.

Moreover, in the folding device 100, the respective unit hinges are rotated relative to one another through gear motions between the unit hinges. Therefore, rotary force may be transmitted in a stable manner and reliability of the folding device 100 may be assured. In addition, the folding device 100 may be manufactured to have a slim structure and, thus, the overall thickness of a foldable display using the folding device 100 may be reduced.

Figure 5:
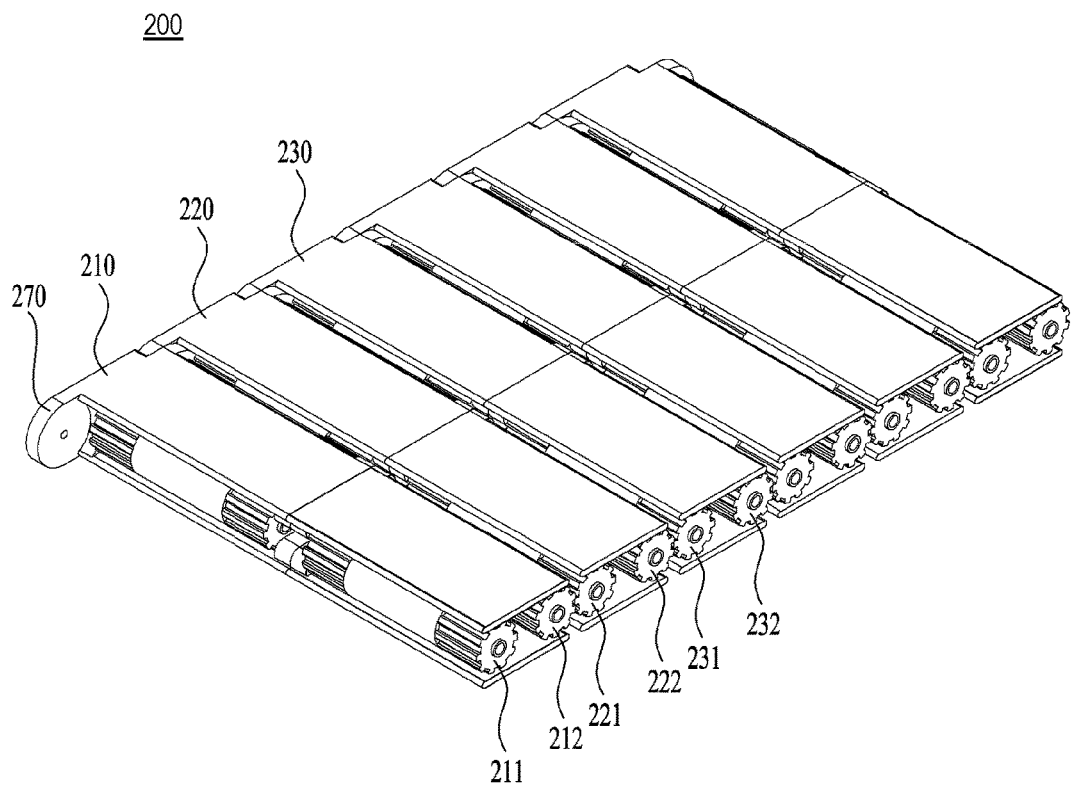
FIG. 5 is a perspective view of a folding device of a foldable display in accordance with another embodiment of the present invention.
Figure 6:
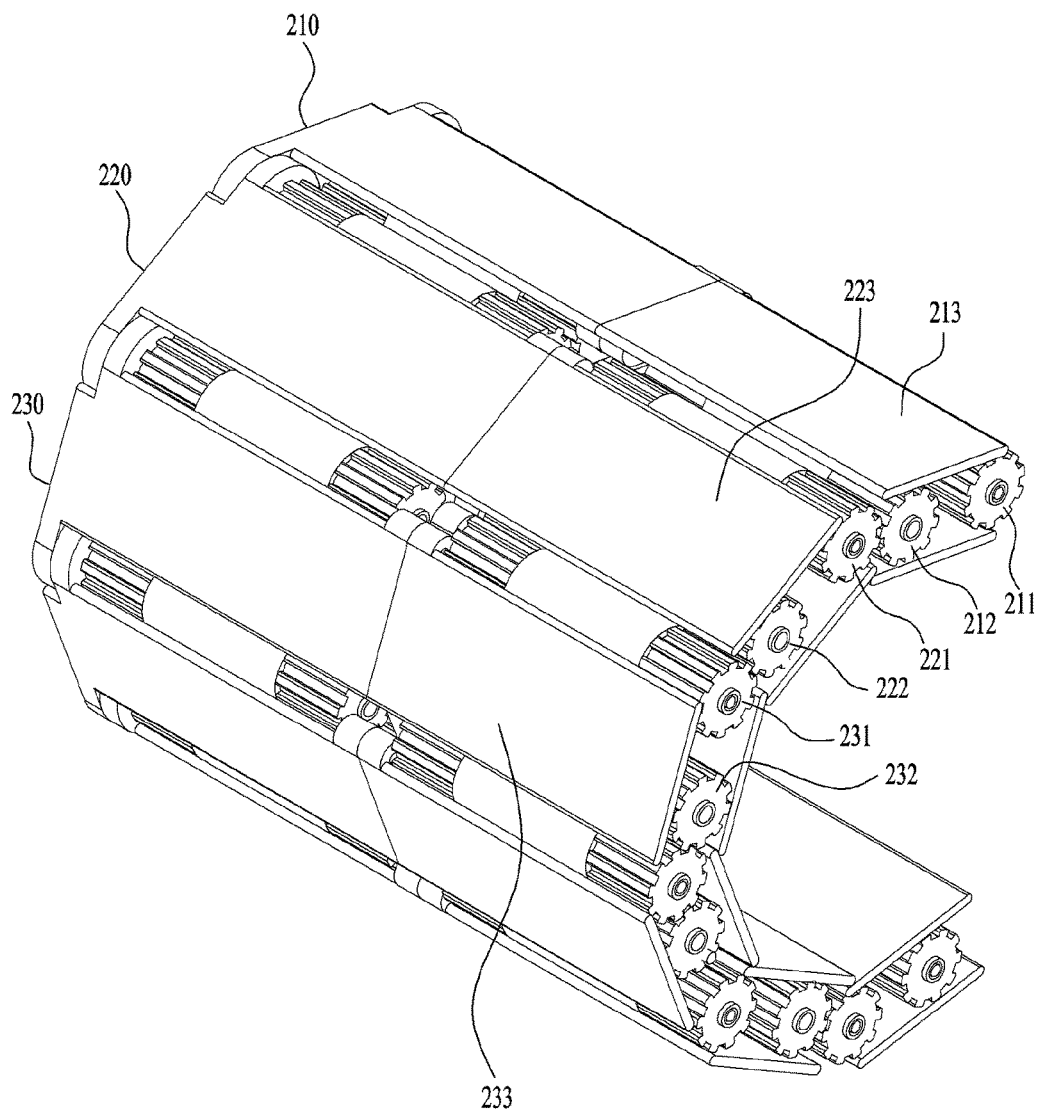
FIG. 6 is a perspective view illustrating the folding device shown in FIG. 5 in a folded state, in accordance with one embodiment of the present invention.
Figure 7:
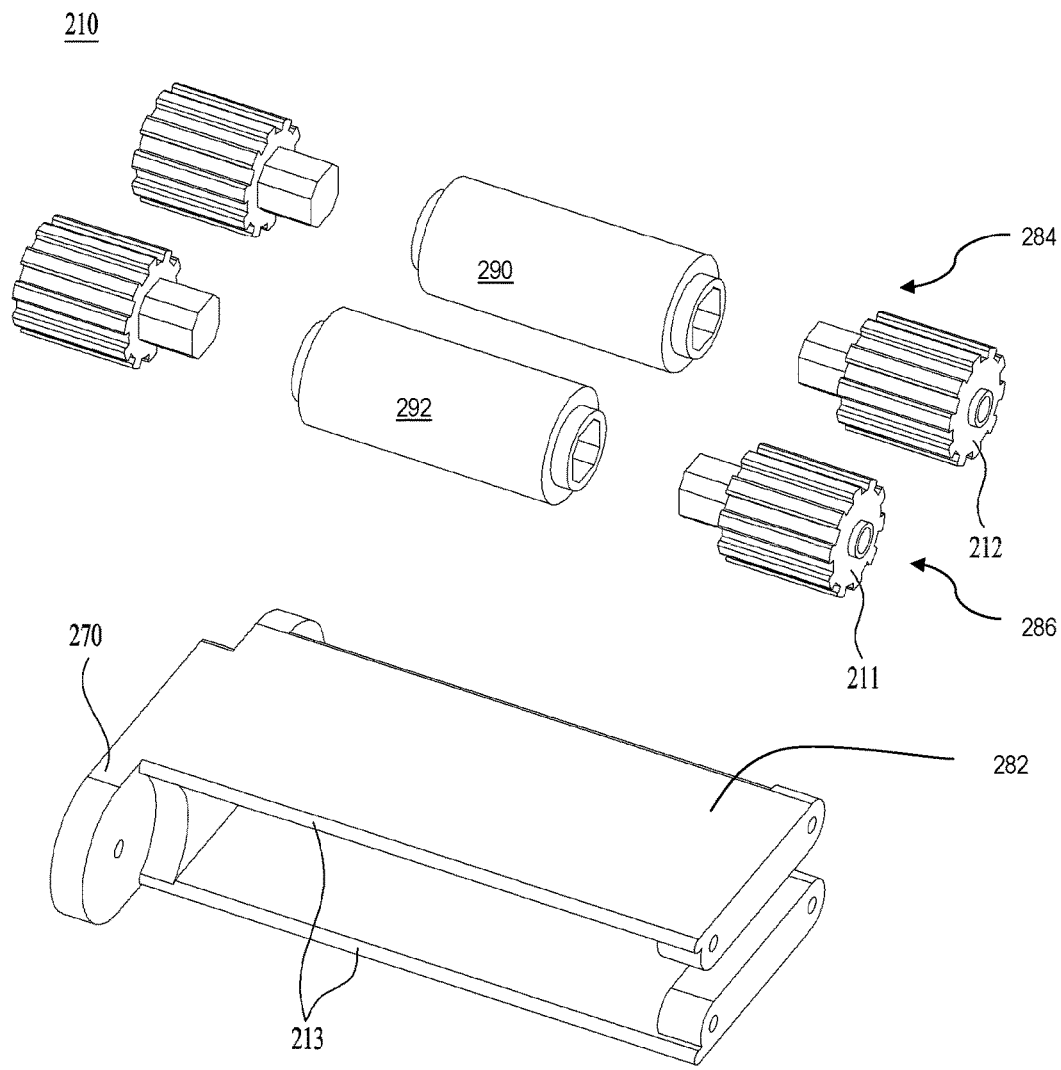
FIG. 7 is an enlarged exploded perspective view of a first unit hinge of the folding device shown in FIG. 5, in accordance with one embodiment of the present invention.

FIG. 5 is a perspective view of a folding device 200 of a foldable display in accordance with another embodiment of the present invention, FIG. 6 is a perspective view illustrating the folding device 200 shown in FIG. 5 in a folded state, and FIG. 7 is an enlarged exploded perspective view of a first unit hinge 210 of the folding device 200 shown in FIG. 5.

With reference to FIGS. 5 through 7, a folding device 200 of a foldable display includes first unit hinges 210, second unit hinges 220, third unit hinges 230 and other unit hinges, which are sequentially disposed, and connection units 270 to interconnect the unit hinges 210, 220, 230, etc., so as to be rotatable. The operating sequence and function of the respective unit hinges 210, 220, 230, etc., are substantially the same as those of the unit hinges 110, 120, 130, etc., in accordance with the former embodiment and, hereinafter, only configuration of the unit hinges 210, 220, 230, etc. differing from that of the unit hinges 110, 120, 130, etc. will be described herein.

First gears 211 and second gears 212 are spaced apart from each other and fixed in parallel to the inside of the first unit hinge 210. The first gears 211 and the second gears 212 are fixed to the inside of the first unit hinge 210 and, thus, individual rotations thereof are restricted.

Further, as shown in FIG. 6, the first unit hinge 210 includes rotation restriction members 213 respectively connecting the upper parts and lower parts of the first and second gears 211 and 212. The rotation restriction members 213 are disposed such that, when the first unit hinge 210 and the second unit hinge 220 are relatively rotated, the rotation restriction member 213 located on the upper part of the first unit hinge 210 and the rotation restriction member 223 located on the upper part of the second unit hinge 220 partially overlap each other and the rotation restriction member 213 located under the lower part of the first unit hinge 210 and the rotation restriction member 223 located under the lower part of the second unit hinge 220 are spaced apart from each other. Therefore, the rotation restriction members 213 and 223 partially overlap each other so as to interfere with each other and, thus, the first unit hinge 210 and the second unit hinge 220 are relatively rotated within a designated angular range.

As illustrated in FIG. 7, the first unit hinge 210 includes a body 282 and two rotary assemblies 284, 286. The rotary assemblies 284, 286 are attached to the body 282 in a non-rotatable manner. The rotary shaft 284 includes a rotary shaft 290 and the second gears 212 attached at both ends of the rotary shaft 290 in a non-rotatable manner. The rotary assembly 286 similarly includes a rotary shaft 292 and the first gears 211 attached at both ends of the rotary shaft 292. The body includes a connection unit 270 and two rotation restriction members 213, one at the top and the other at the bottom.

Further, the first gear 211 and the second gear 212 enable multiple-axis rotation to be carried out in the same manner as the former embodiment. Therefore, the unit hinges 210, 220, 230, etc. may relatively rotate sequentially or in stages.

Figure 9:
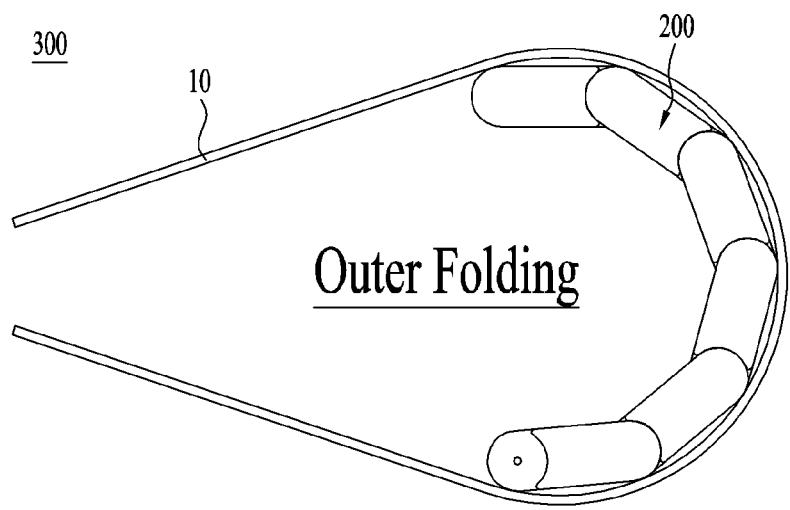

Of course, as shown in FIG. 8 or 9, the folding device 200 can function as an outer folding type and an inner folding type. FIGS. 8 and 9 are views illustrating folding types of display devices having the folding device shown in FIG. 5. As shown in FIG. 5, when the folding device 200 is in an unfolded state, the top surfaces of the rotation restriction members on the top of the folding devices are co-planar with each other. Similarly, the top surfaces of the rotation restriction members at the bottom of the folding devices are also co-planar with each other.

A display device 300 having a folding device 200 of a foldable display may be an inner folding type in which the display device 300 is folded such that both sections of a display area of a display panel 10 are opposite to each other in the display device 300 and the folding device 200 is disposed on the rear surface of the display panel 10, as illustrated in FIG. 8. Further, a display device 300 having a folding device 200 of a foldable display may be an outer folding type in which the display device 300 is folded such that a display area of a display panel 10 is exposed to the outside and the folding device 200 is disposed on the rear surface of the display panel 10, as illustrated in FIG. 9. The inner folding type display device 300 is advantageous, among other reasons, in that the display panel 10 may be protected, and the outer folding type display device 300 is advantageous, among other reasons, in that content displayed in the display area may be confirmed even in the folded state of the display panel 10. Of course, both in the inner folding type display device 300 and the outer folding type display device 300, the folding device 200 may be disposed on the rear surface of the display panel 10 such that the display panel 10 is foldable at other areas than the central area thereof.

Therefore, the folding devices 100, 200 in accordance with the present invention includes a plurality of unit hinges, the adjacent unit hinges are engaged with each other so that relative rotations thereof are carried out and thus the respective unit hinges may be relatively rotated in stages. Further, when one unit hinge is rotated about another unit hinge, such rotation does not influence rotation of yet another unit hinge and thus the respective unit hinges may be relatively rotated sequentially. In addition, the respective unit hinges are relatively rotated by gear motions thereof and thus rotary force may be transmitted in a stable manner and reliability may be assured. Moreover, the folding devices 100, 200 may be manufactured so as to have a slim structure and thus the overall thickness of a foldable display device having the folding device 100 or 200 may be reduced.

As is apparent from the above description, a folding device of a foldable display and a display device having the same in accordance with the present invention have one or more of the following advantages.

First, the folding device includes a plurality of unit hinges, the adjacent unit hinges are engaged with each other so that relative rotations thereof are carried out and thus the individual unit hinges may be rotated relatively in stages.

Second, when one unit hinge is rotated about another unit hinge, such rotation does not influence rotation of yet another unit hinge and thus the respective unit hinges may be relatively rotated sequentially.

Third, the folding device having the above-described structure is applicable to both an inner folding type display device and an outer folding type display device.

Fourth, the respective unit hinges are relatively rotated by gear motions thereof and thus rotary force may be stably transmitted and reliability may be assured.

Fifth, the folding device may be manufactured so as to have a slim structure and thus the overall thickness of the foldable display device having the folding device may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A folding device of a foldable display, comprising:
    a plurality of unit hinges including a first unit hinge and a second unit hinge adjacent to the first unit hinge, the first unit hinge rotatable relative to the second unit hinge,
    wherein the first unit hinge comprises:
        a first rotary shaft extending in a direction around which the first unit hinge rotates relative to the second unit hinge,
        a second rotary shaft extending in parallel relative to the first rotary shaft and spaced apart from the first rotary shaft,
        a first gear formed on a first end of the first unit hinge and placed closer to the first rotary shaft than the second rotary shaft,
        a second gear formed on a second end of the first unit hinge and meshing with a third gear of the second unit hinge, the second gear placed closer to the second rotary shaft than the first rotary shaft,
        a first flat surface extending from the first gear to the second gear at one side of the folding device, the first flat surface configured to come into contact with and support a surface of the foldable display, a first rotation restriction member protruding from the first end in a direction away from the second end, and a first interference groove of an arc shape indented into the second end and configured to receive a third rotation restriction member of the second unit hinge to restrict a relative rotation between the first unit hinge and the second unit hinge to a predetermined range; and a plurality of connection units between two adjacent unit hinges of the plurality of unit hinges, each of the connection units securing the second rotary shaft of the first unit hinge and a third rotary shaft of the second unit hinge in a rotatable manner.

2. The folding device according to claim 1, wherein the first end and the second end are semi-cylindrical shaped.

3. The folding device according to claim 1, wherein a relative rotation of a first pair of the unit hinges is independent of a relative rotation of a second pair of the unit hinges.

4. The folding device according to claim 1, wherein the plurality of unit hinges further comprise a third unit hinge adjacent to and meshing with the second unit hinge.

5. The folding device according to claim 4, wherein a relative rotation between the first unit hinge and the second unit hinge occurs before or after a relative rotation between the second unit hinge and the third unit hinge.

6. The folding device according to claim 1, wherein the folding device is attached to a display panel that is folded in an outer folding manner so that a display area of the display panel faces outwards when folded.

7. The folding device according to claim 1, wherein the folding device is attached to a display panel that is folded in an inner folding manner so that portions of a display area of the display panel face each other when folded.

8. The folding device according to claim 1, wherein each of the first end and the second end has a semi-cylindrical surface on which the first gear or the second gear is formed.

9. The folding device of claim 1, wherein each of the unit hinges further comprises another flat surface extending between the first gear and the second gear at a side opposite to the flat surface.

10. The folding device of claim 1, wherein the at least one of the unit hinges further includes:

another rotation restriction member protruding from the first end in a direction away from the second end, the first gear between the rotation restriction member and the other restriction member.

11. The folding device of claim 10, wherein the at least one of the unit hinges further includes:

another interference groove formed in the second end to receive another rotating restriction member of a unit hinge adjacent to the at least one of the unit hinges to restrict the relative rotation between the at least one of the unit hinges and an unit hinge adjacent to the at least one of the unit hinges, the second gear between the interference groove and the other interference groove.

12. A display apparatus comprising:

a plurality of unit hinges including a first unit hinge and a second unit hinge adjacent to the first unit hinge, the first unit hinge rotatable relative to the second unit hinge, wherein the first unit hinge comprises:

a first rotary shaft extending in a direction around which the first unit hinge rotates relative to the second unit hinge, a second rotary shaft extending in parallel relative to the first rotary shaft and spaced apart from the first rotary shaft, a first gear formed on a first end of the first unit hinge and placed closer to the first rotary shaft than the second rotary shaft, a second gear formed on a second end of the first unit hinge and meshing with a third gear of the second unit hinge, the second gear placed closer to the second rotary shaft than the first rotary shaft, a flat surface extending from the first gear to the second gear at one side of the plurality of unit hinges, a first rotation restriction member protruding from the first end in a direction away from the second end, and a first interference groove of an arc shape indented into the second end and configured to receive a third rotation restriction member of the second unit hinge to restrict a relative rotation between the first unit hinge and the second unit hinge to a predetermined range;

a plurality of connection units between two adjacent unit hinges of the plurality of unit hinges, each of the connection units securing the second rotary shaft of the first unit hinge and a third rotary shaft of the second unit hinge in a rotatable manner; and a display panel having a surface that come into contact with and is supported by the flat surface of each of the plurality of unit hinges.

* * * * *